2,832,781
Patented Apr. 29, 1958

2,832,781

6-CHLOROPURINE

George H. Hitchings, Tuckahoe, and Gertrude B. Elion, Bronxville, N. Y., assignors to Burroughs Wellcome & Co. (U. S. A.) Inc., Tuckahoe, N. Y., a corporation of New York No Drawing. Application January 4, 1956
Serial No. 557,249

1 Claim. (Cl. 260—254)

This invention relates to a novel purine compound substituted at the 6-position of the purine ring. More particularly, the invention relates to the compound 6-chloropurine valuable as an intermediate in the preparation of 6-mercaptopurine, described and claimed in U. S. Patent 2,697,709, issued December 21, 1954. 6-mercaptopurine has been established as a valuable chemotherapeutic agent in the treatment of various forms of leukemia. It has been discovered that 6-chloropurine, in addition to being an intermediate in the synthesis of 6-mercaptopurine, in physiological behavior resembles 6-mercaptopurine. The compound may be represented by the following formula:

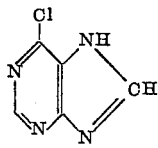

In accordance with the invention, 6-chloropurine is prepared by a novel method and this compound, which may be used in the preparation of the 6-mercapto and 6-amino purines, is likewise useful in the synthesis of certain derivatives which are not readily attainable via the 6-mercaptopurine route. The novel compound 6-mercaptopurine may likewise be prepared by other methods, including the treatment of a suspension of 6-mercaptopurine hydrate in absolute ethyl alcohol with nascent chlorine gas, as described in the copending application of Hitchings and Elion, Serial No. 511,127, filed May 27, 1955. These derivatives encompass a wide range of 6-substituted purines and in accordance with the invention, purine compounds substituted at the 6-position with cyano, carboxy, selenyl, telluryl, iodo, fluoro and alkyl and aryl, as derived through reactions with organo metal derivatives, are readily prepared. Many of these compounds are specifically active in the treatment of experimental tumors in animals.

In accordance with the invention, 6-chloropurine is formed by the treatment of hypoxanthine with phosphoryl chloride in the presence of an unreactive base such as dimethyl aniline. It may likewise be formed by heating hypoxanthine under pressure with phosphoryl chloride as well as with a reagent prepared by adding water, preferably about 5% by volume, to dry phosphoryl chloride.

The following examples are illustrative.

EXAMPLE 1

A mixture of 5 g. of hypoxanthine, 1.0 g. of N,N-dimethylaniline and 100 ml. of phosphoryl chloride was refluxed for 2 hours. The hypoxanthine gradually dissolved. The reaction mixture was evaporated to a small volume in vacuo. The residue was leached with a small quantity of ether, and the 6-chloropurine was recovered by solution in methanol.

EXAMPLE 2

A mixture of 2 g. of hypoxanthine and 20 ml. of phosphoryl chloride was heated in a sealed tube at 160° for 5 hours. The mixture was evaporated to a small volume in vacuo and poured over ice. By the addition of ammonium hydroxide, the pH value of the solution was adjusted to about 5 with the formation of a precipitate containing 6-chloropurine. The 6-chloropurine was recovered by leaching the precipitate with hot acetone.

EXAMPLE 3

A mixture of 8 g. of hypoxanthine and 48 ml. of phosphoryl chloride, to which had been added 2.5 ml. of water, was heated in a sealed tube at 165° for 6 hours. The mixture was evaporated to a small volume in vitro, poured over ice and the 6-chloropurine recovered by continuous extraction with ether.

The compound 6-chloropurine is characterized by its ultra-violet absorption spectrum having band at about 265 m$\mu$ at pH 11 which shifts to about 273 m$\mu$ at pH 11. The compound melts and decomposes at temperatures between 170 to 180°, depending upon the rate of heating. The preparation of 6-mercaptopurine from 6-chloropurine may be illustrated by the following example:

EXAMPLE 4

*6-mercaptopurine*

6-chloropurine (2.5 g.) and potassium hydrosulfide solution (36 ml. N containing 30 millicuries of $S^{35}$ as hydrosulfide) were heated in a sealed tube at 100° for 7 hours. The tube was cooled and opened, the contents made alkaline by adding 20 ml. of 2 N sodium hydroxide, filtered and acidified to pH 4. The 6-mercaptopurine (2.3 g.) was collected on a filter, washed with water, alcohol and ether and air dried. It counted 7,000 c./min./microgram using a flow counter. Further material was recovered from the filtrate by adding an alkaline solution of 6-mercaptopurine to the filtrate and recovering the solid which formed on acidification.

The present application is a continuation in part of Hitchings et al. applications, Serial Nos. 367,772 and 375,819, filed July 13 and August 21, 1953, respectively.

What we claim is:

6-chloropurine.

References Cited in the file of this patent

UNITED STATES PATENTS 2,697,709    Hitchings et al. _____ Dec. 21, 1954

OTHER REFERENCES

Fischer: "Ber." 32, 435–504 (1899).

Albert et al.: "Journal of the Chemical Society, London," 1954, 2060–2071.

Mason: "Journal of the Chemical Society, London," 1954, 2071–2081.